US012774887B2

(12) United States Patent
Wu et al.

(10) Patent No.: US 12,774,887 B2
(45) Date of Patent: Oct. 27, 2026

(54) RESONANT OPTICAL GYROSCOPE USING OPTICAL FREQUENCY COMBS EACH OF WHOSE SPECTRAL COMPONENTS ARE NOT PHASE LOCKED

(71) Applicant: Honeywell International Inc., Charlotte, NC (US)

(72) Inventors: Jianfeng Wu, Tucson, AZ (US); Tiequn Qiu, Glendale, AZ (US); Steven Tin, Edina, MN (US); Glen A. Sanders, Scottsdale, AZ (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 136 days.

(21) Appl. No.: 18/909,726

(22) Filed: Oct. 8, 2024

(65) Prior Publication Data

US 2026/0098727 A1 Apr. 9, 2026

(51) Int. Cl.
*G01C 19/72* (2006.01)
*G01C 25/00* (2006.01)

(52) U.S. Cl.
CPC ......... *G01C 19/727* (2013.01); *G01C 19/721* (2013.01); *G01C 25/00* (2013.01)

(58) Field of Classification Search
CPC .... G01C 19/727; G01C 19/721; G01C 25/00; G01C 19/66; G01C 19/64; G01C 19/72; G01C 19/726; G02B 6/29338; G02B 6/2934
See application file for complete search history.

(56) References Cited

U.S. PATENT DOCUMENTS

| | | | | |
|---|---|---|---|---|
| 8,659,760 B2 | 2/2014 | Sanders et al. | | |
| 2013/0271770 A1* | 10/2013 | Sanders | G01C 19/726 | 356/461 |
| 2016/0204571 A1* | 7/2016 | Wu | H01S 3/302 | 359/334 |
| 2020/0400495 A1* | 12/2020 | Kippenberg | G02F 1/365 | |

FOREIGN PATENT DOCUMENTS

| | | |
|---|---|---|
| EP | 2650644 A2 | 10/2013 |
| EP | 3048420 A1 | 7/2016 |
| EP | 2650644 A3 | 11/2017 |

OTHER PUBLICATIONS

Smith et al., "Dispersion-Enhanced Laser Gyroscope", NASA, dated Jun. 16, 2008, as downloaded Jul. 17, 2024 from https://ntrs.nasa.gov/api/citations/20090019025/downloads/20090019025.pdf, pp. 1 through 40.

(Continued)

*Primary Examiner* — Tarifur R Chowdhury
*Assistant Examiner* — Kaitlyn E Kidwell
(74) *Attorney, Agent, or Firm* — Fogg & Powers LLC

(57) ABSTRACT

A technique is provided for reducing angle random walk (ARW) noise in a resonant optical gyroscope (ROG) using a pair of optical frequency combs. The ARW noise is reduced by propagating each optical frequency comb through a dispersive optical component. As a result, at least some of the spectral components, of an optical frequency comb emitted from a dispersive optical component, are no longer phase locked. As a result, ROG rotation rate accuracy is increased.

20 Claims, 6 Drawing Sheets

(56) References Cited

OTHER PUBLICATIONS

Zhou et al., "Dynamic modulation of modal coupling in microelectromechanical gyroscopic ring resonators", Nature Communications, vol. 10, 4980, Oct. 31, 2019, pp. 1 through 9.
European Patent Office, "Extended European Search Report", dated Mar. 6, 2026, from EP Application No. 25207317.6, from Foreign Counterpart to U.S. Appl. No. 18/909,726, pp. 1 through 6, Published: EP.
Sumathi et al., "Investigation of Bias Stability Enhancement using Frequency comb source in Resonant Fiber Optic Gyroscope", Optical and Quantum Sensing and Precision Metrology II, Proc of SPIE, vol. 12016, Mar. 3, 2022, pp. 120160T-1 through 120160T-9.

* cited by examiner

RESONANT OPTICAL GYROSCOPE USING OPTICAL FREQUENCY COMBS EACH OF WHOSE SPECTRAL COMPONENTS ARE NOT PHASE LOCKED

BACKGROUND

A resonant optical gyroscope (ROG) using a pair of optical frequency combs, instead of a pair of single spectral components, improves ROG signal to noise ratio (SNR) because each pair of a spectral component of each optical frequency comb acts as an independent gyroscope. Resonance asymmetries in outputs of each such independent gyroscope can be averaged to increase ROG bias stability. However, because the spectral components of each optical frequency comb are phase locked, the angle random walk (ARW) noise component is unaffected by such averaging.

SUMMARY

In some aspects, the techniques described herein relate to a resonant optical gyroscope (ROG) with reduced angle random walk noise, the ROG including: a first optical frequency comb source including a first laser and configured to emit a first optical frequency comb with spectral components equally spaced in frequency; a second optical frequency comb source including a second laser and configured to emit a second optical frequency comb with spectral components equally spaced in frequency; a first dispersive optical circuit optically coupled to the first optical frequency comb source and configured, using the first optical frequency comb, to generate a third optical frequency comb by changing a phase of at least some spectral components of the first optical frequency comb, wherein the third optical frequency comb has at least some spectral components that do not have a same phase as any other spectral component of the third optical frequency comb; a second dispersive optical circuit optically coupled to the second optical frequency comb source and configured, using the second optical frequency comb, to generate a fourth optical frequency comb by changing a phase of at least some spectral components of the second optical frequency comb, wherein the fourth optical frequency comb has at least some spectral components that do not have a same phase as any other spectral component of the fourth optical frequency comb; a coupled optical resonator optically coupled to each of the first and the second dispersive optical circuits, and configured to propagate at least a portion of the third optical frequency comb around a first direction in the coupled optical resonator and to propagate at least a portion of the fourth optical frequency comb around a second direction in the coupled optical resonator, wherein the first direction is opposite the second direction; a first optical detector optically coupled to the coupled optical resonator and configured to generate a first electrical signal derived from at least a portion of the at least a portion of the third optical frequency comb received from the coupled optical resonator; a second optical detector optically coupled to the coupled optical resonator and configured to generate a second electrical signal derived from at least a portion of the at least a portion of the fourth optical frequency comb received from the coupled optical resonator; wherein the first optical frequency comb source is configured to use the first electrical signal, or a signal derived therefrom, to align frequencies of the spectral components of the first optical frequency comb with resonances in the first direction of the coupled optical resonator; wherein the second optical frequency comb source is configured to use the second electrical signal, or a signal derived therefrom, to align frequencies of the spectral components of the second optical frequency comb with resonances in the second direction of the coupled optical resonator; and processing circuitry configured to, using data indicative of frequencies of pairs of spectral components of the first and the second optical frequency combs, determine an angular rate of rotation of the coupled optical resonator.

In some aspects, the techniques described herein relate to a method for reducing angle random walk noise of a resonant optical gyroscope (ROG), the method including: transmitting a first optical frequency comb; transmitting a second optical frequency comb, wherein each of the first and the second optical frequency combs has spectral components equally spaced in frequency; generating a third optical frequency comb by changing a phase of at least some spectral components of the first optical frequency comb, wherein the third optical frequency comb has at least some spectral components that do not have a same phase as any other spectral component of the third optical frequency comb; generating a fourth optical frequency comb by changing a phase of at least some spectral components of the second optical frequency comb, wherein the fourth optical frequency comb has at least some spectral components that do not have a same phase as any other spectral component of the fourth optical frequency comb; propagating, around a coupled optical resonator in a first direction, at least a portion of the of the third optical frequency comb; propagating, around the coupled optical resonator in a second direction, at least a portion of the fourth optical frequency comb, wherein the first direction is opposite the second direction; generating a first electrical signal derived from at least a portion of the at least a portion of the third optical frequency comb received from the coupled optical resonator; generating a second electrical signal derived from at least a portion of the at least a portion of the fourth optical frequency comb received from the coupled optical resonator; using the first electrical signal, or a signal derived therefrom, adjusting frequencies of each spectral component of the first optical frequency comb to align frequencies of the spectral components of the first optical frequency comb with resonances in the first direction of the coupled optical resonator; using the second electrical signal, or a signal derived therefrom, adjusting frequencies of each spectral component of the second optical frequency comb to align frequencies of the spectral components of the second optical frequency comb with resonances in the second direction of the coupled optical resonator; and using data indicative of frequencies of pairs of spectral components of the first and the second optical frequency combs, determining an angular rate of rotation of the coupled optical resonator.

In some aspects, the techniques described herein relate to a resonant optical gyroscope (ROG) with reduced angle random walk noise, the ROG including: a first optical frequency comb source including a first laser and configured to emit a first optical frequency comb with spectral components equally spaced in frequency; a second optical frequency comb source including a second laser and configured to emit a second optical frequency comb with spectral components equally spaced in frequency; a first dispersive optical circuit optically coupled to the first optical frequency comb source and configured, using the first optical frequency comb, to generate a third optical frequency comb by changing a phase of at least some spectral components of the first optical frequency comb, wherein the third optical frequency comb has at least some spectral components that do not have a same phase as any other spectral component of the third optical frequency comb; a second dispersive optical circuit optically coupled to the second optical frequency comb source and configured, using the second optical frequency comb, to generate a fourth optical frequency comb by changing a phase of at least some spectral components of the second optical frequency comb, wherein the fourth optical frequency comb has at least some spectral components that do not have a same phase as any other spectral component of the fourth optical frequency comb; a coupled optical resonator, including an optical resonator with a rotation axis, optically coupled to each of the first and the second dispersive optical circuits, and configured to propagate at least a portion of the third optical frequency comb around a first direction in the coupled optical resonator and to propagate at least a portion of the fourth optical frequency comb around a second direction in the coupled optical resonator, wherein the first direction is opposite the second direction; a first optical detector optically coupled to the coupled optical resonator and configured to generate a first electrical signal derived from at least a portion of the at least a portion of the third optical frequency comb received from the coupled optical resonator; a second optical detector optically coupled to the coupled optical resonator and configured to generate a second electrical signal derived from at least a portion of the at least a portion of the fourth optical frequency comb received from the coupled optical resonator; wherein the first optical frequency comb source is configured to use the first electrical signal, or a signal derived therefrom, to align frequencies of the spectral components of the first optical frequency comb with resonances in the first direction of the coupled optical resonator; wherein the second optical frequency comb source is configured to use the second electrical signal, or a signal derived therefrom, to align frequencies of the spectral components of the second optical frequency comb with resonances in the second direction of the coupled optical resonator; and processing circuitry configured to, using data indicative of frequencies of pairs of spectral components of the first and the second optical frequency combs, determine an angular rate of rotation around the rotation axis of the coupled optical resonator.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout figures and text.

DETAILED DESCRIPTION

Figure 1A:
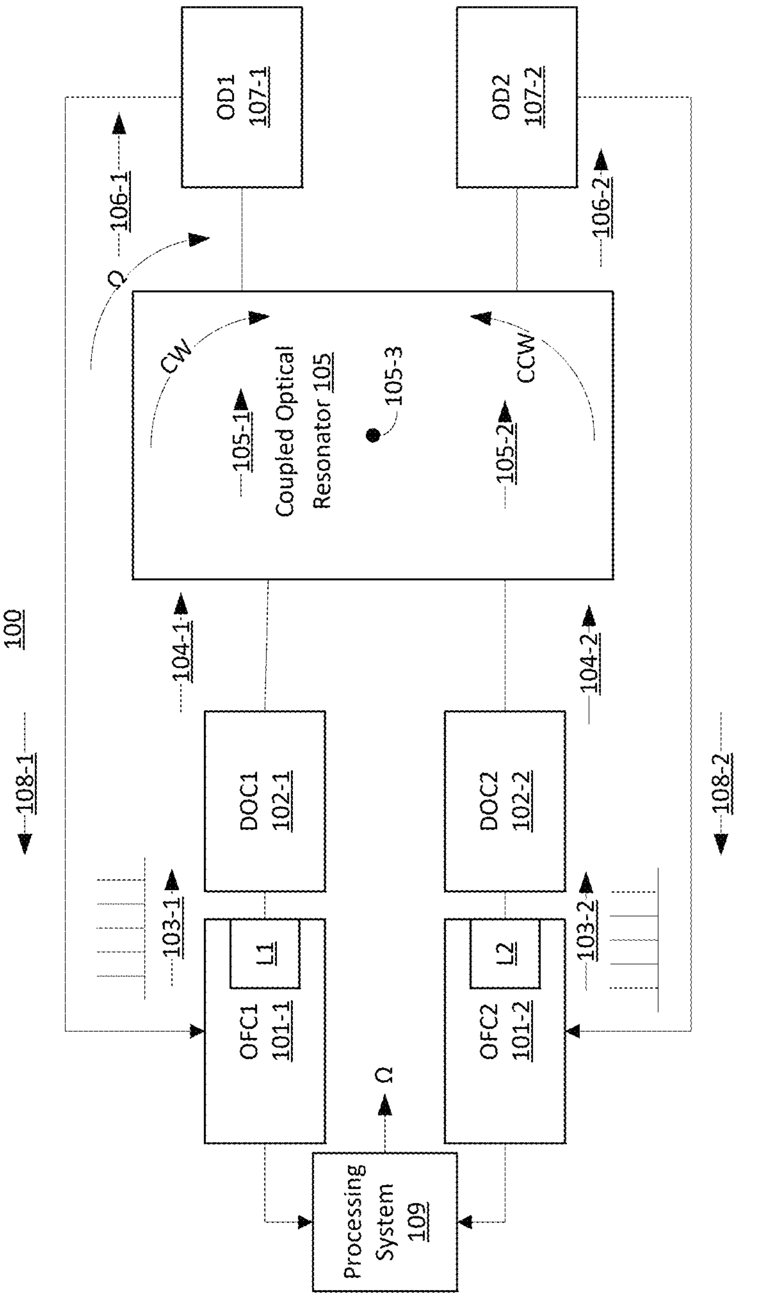
FIG. 1A illustrates a block diagram of a resonant optical gyroscope using a pair of optical frequency combs according to embodiments of the invention.

In the following detailed description, reference is made to the accompanying drawings that form a part hereof, and in which is shown by way of illustration specific illustrative embodiments. However, it is to be understood that other embodiments may be utilized, and that structural, mechanical, and/or electrical changes may be made. Furthermore, each method presented in the drawing figures and the specification is not to be construed as limiting the order in which the individual steps may be performed. The following detailed description is not to be taken in a limiting sense.

Embodiments of the invention provide a technological improvement to resonant optical gyroscopes using a pair of optical frequency combs. The ARW noise component of such ROGs is reduced by utilizing dispersive optical circuits or components which cause the spectral components of each optical frequency comb not to be phase locked. As a result, ROG rotation rate accuracy is increased.

FIG. 1A illustrates a block diagram of a resonant optical gyroscope using a pair of optical frequency combs (ROG-OFC) 100 according to embodiments of the invention. The ROG-OFC 100 includes a first optical frequency comb source (or a first optical frequency comb source circuit) (OFC1) 101-1, a second optical frequency comb source (or a second optical frequency comb source circuit) (OFC2) 101-2, a first dispersive optical circuit (DOC1) 102-1, a second dispersive optical circuit (DOC2) 102-2, a coupled optical resonator 105, a first optical detector (OD1), a second optical detector (OD2), and a processing system (or processing circuitry) 109. Optionally, the processing system 109 includes at least one processor circuit communicatively coupled to at least one memory circuit.

Each optical frequency comb source 101-1, 101-2 is configured to generate an optical frequency comb 103-1, 103-2. Optionally, each optical frequency comb has thousands to hundreds of thousands evenly spaced, in frequency, spectral components spanning a bandwidth which may range from one gigahertz to one hundred terahertz. Optionally, each optical frequency comb is substantially identical, e.g., having substantially the same spectral components and/or substantially the same spectral component power levels.

Optionally, each optical frequency comb source 101-1, 101-2 includes at least one laser L1, L2. Optionally, each optical frequency comb source 101-1, 101-2 is a laser whose optical signal is phase modulated, a laser optically coupled to an optical resonator, a mode locked laser, a laser optically coupled to a non-linear optical circuit (or device), a mode locked laser optically coupled to non-linear optical material (e.g., a photonic crystal fiber), or any other optical circuit or device configured to generate an optical frequency comb. Optionally, the non-linear optical circuit may be a Kerr cavity or an electro-optical modulator. The mode locked laser optically coupled to non-linear optical material is known as supercontinuum light source. Each optical frequency comb source 101-1, 101-2 is configured to transmit an optical frequency comb 103-1, 103-2 to a unique dispersive optical circuit 102-1, 102-2.

Figure 1B:
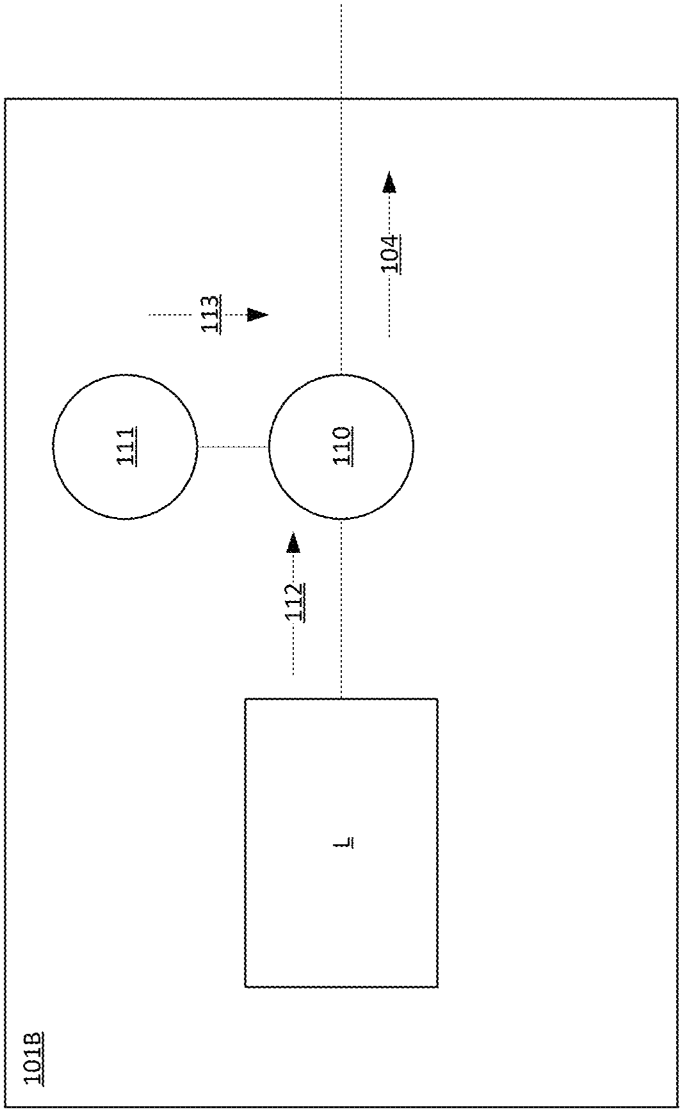
FIG. 1B illustrates a block diagram of one embodiment of an optical frequency comb source implemented with at least one optical phase modulator.

FIG. 1B illustrates a block diagram of one embodiment of an optical frequency comb source 101A implemented with at least one optical phase modulator. Each optical phase modulator is coupled to a unique periodic signal source. Each periodic signal source has a different fundamental frequency, e.g., where each fundamental frequency is a multiple of at least one other frequency. The use of more than one periodic signal source with different fundamental frequencies expands a bandwidth of the optical frequency comb and also increase a number of spectral components of the optical frequency comb.

For pedagogical purposes, FIG. 1B illustrates a single pair of an optical phase modulator 110 and a periodic signal source 111; however, more than one pair of optical phase modulators and periodic signal sources may be used for the reasons discussed above. The optical frequency comb source 101A implemented with the phase modulator includes a laser L optically coupled to an optical phase modulator 110. The optical phase modulator 110 is also coupled to a periodic signal source 111, e.g., a radio frequency (RF) carrier wave (CW) signal source. The laser L is configured to emit, and the optical phase modulator 110 is configured to receive, a narrow spectrum optical signal 112. The periodic signal source 111 is configured to emit, and the optical phase modulator 110 is configured to receive, a periodic signal 113, e.g., an RF CW signal. Using the narrow spectrum optical signal 112 and the periodic signal 113, the optical frequency comb source 101A, e.g., the optical phase modulator 110 is configured to emit an optical frequency comb 104.

Figure 1C:
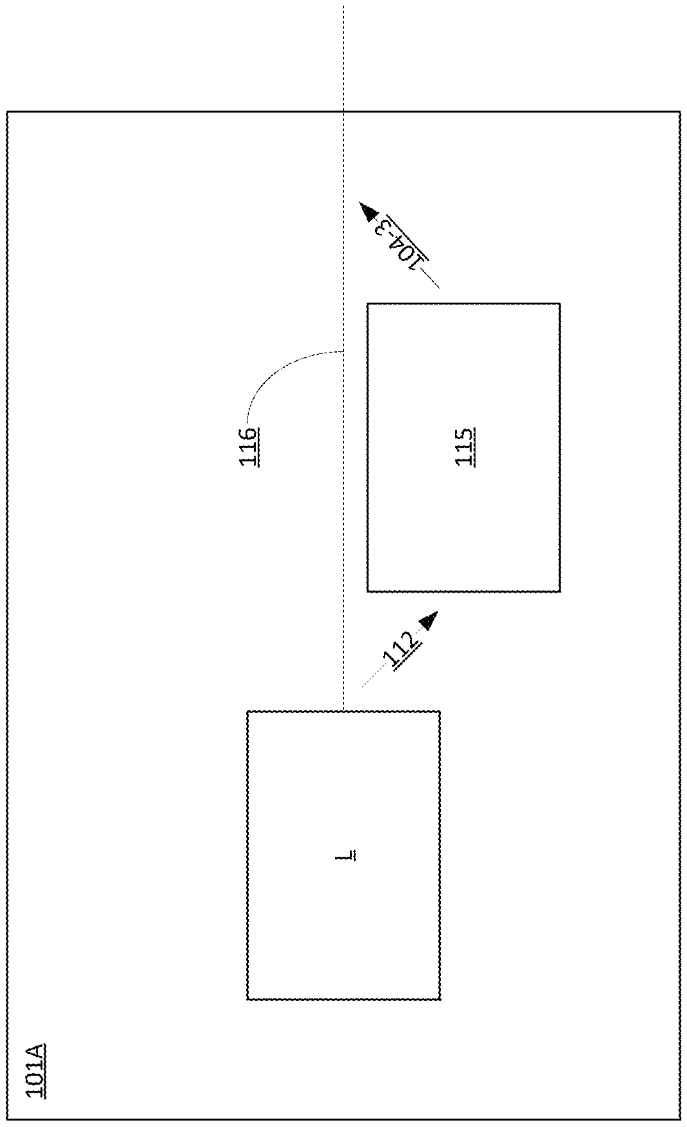
FIG. 1C illustrates a block diagram of one embodiment of an optical frequency comb source implemented with an optical resonator.

FIG. 1C illustrates a block diagram of one embodiment of an optical frequency comb source 101B implemented with an optical resonator. The optical frequency comb source 101B implemented with the optical resonator includes a laser L optically coupled to an optical waveguide 116. The optical waveguide 116 is also optically coupled to an optical resonator 115. Optionally, the optical waveguide 116 is optical fiber and/or planar optical waveguide. Optionally, the optical resonator 115 is a disc, ring, race track, oval, microresonator, or any other type of optical resonator. The laser L is configured to emit, and the optical waveguide is configured to receive, a narrow spectrum optical signal 112. A portion of the narrow spectrum optical signal 112 is optically coupled to the optical resonator 115. A frequency of the carrier wave of the narrow spectrum optical signal 112 is substantially equal to a resonant frequency of the optical resonator 115 so that the optical resonator generates an optical frequency comb with components at each resonance of the optical resonator 115. The optical frequency comb 104-3 is optically coupled to the optical waveguide 116. The optical frequency comb 104-3 is emitted by the optical frequency comb source 101B, e.g., the optical waveguide 116.

The first dispersive optical circuit 102-1 is configured to receive a first optical frequency comb 103-1 from the first optical frequency comb source 101-1. The second dispersive optical circuit 102-2 is configured to receive a second optical frequency comb 103-2 from the second optical frequency comb source 101-2.

Each dispersive optical circuit 102-1, 102-2 is an optical material or an optical component configured to have a non-zero, e.g., positive number, group delay dispersion. The first dispersive optical circuit 102-1 has a first group delay dispersion. The second dispersive optical circuit 102-2 has a second group delay dispersion. The first and the second group delay dispersions may be equal or different. Optionally, the absolute value of such group delay dispersion is greater than 100 femtoseconds$^2$. Optionally, optical components with such a non-zero group delay dispersion include a chirped Bragg grating whose grating period varies (linearly or non-linearly) over a length of the grating, a Bragg grating with a fixed grating period but with an optical waveguide core width or diameter which varies linearly or non-linearly over the length of the Bragg grating, and a waveguide with non-zero group delay dispersion and optionally a length greater than one thousand times a carrier wave wavelength of the narrow spectral width optical signal emitted by the laser. For the middle implementation, the optical waveguide core width or diameter may vary periodically, e.g., based on a sine, square, triangle, sawtooth, or other wave function.

Figure 2:
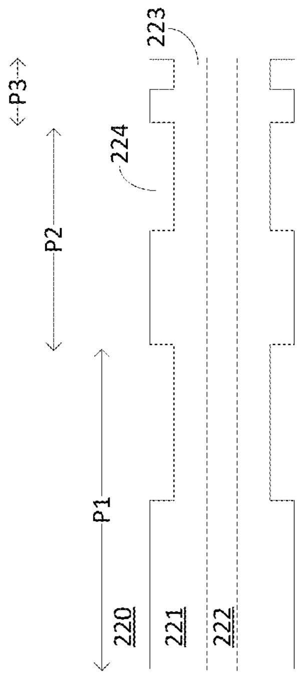
FIG. 2 illustrates a diagram of one embodiment of a dispersive optical circuit that is a chirped Bragg grating.

FIG. 2 illustrates a diagram of one embodiment of a dispersive optical circuit that is a chirped Bragg grating 220. A chirped Bragg grating is a Bragg grating where the grating period varies along the length of the gratings. Where a standard Bragg grating reflects a specific wavelength, the chirped Bragg grating reflects a range of wavelengths, each from a different position along the chirped Bragg grating; each reflected wavelength has a different phase. There are different methods to form the Bragg gratings in optical fibers and planar optical waveguides.

The chirped Bragg grating 220 has a varying grating period; the illustrated chirped Bragg grating has three different grating periods P1, P2, and P3, where P1>P2>P3; however, the chirped Bragg grating may be implemented in other ways. The Bragg grating forms recesses 224 in cladding 221 of the optical waveguide 223. The cladding 221 surrounds a core 222 which has a constant diameter, or width and height. Optionally, the chirped Bragg grating is formed in optical fiber or planar optical waveguide. The core 222 has a higher index of refraction than the cladding 221.

Figure 3A:
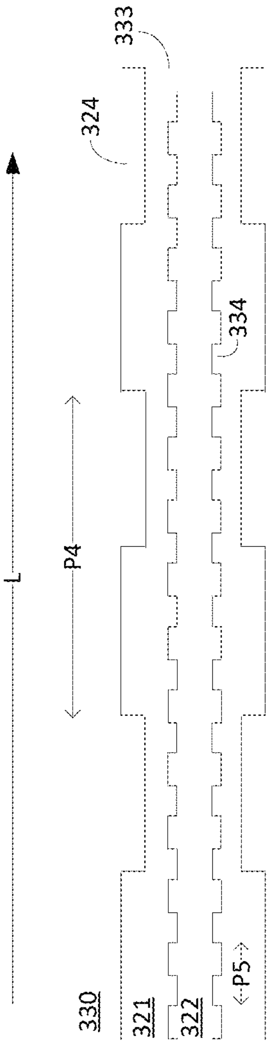
FIG. 3A illustrates a plan view of a Bragg grating with a fixed grating period and an optical waveguide core width or diameter which varies over a length of the Bragg grating.

FIG. 3A illustrates a plan view of a Bragg grating 330 with a fixed grating period and an optical waveguide core width or diameter which varies over a length L of the Bragg grating. The Bragg grating 330 has a constant grating period P4 in the cladding 321 and a variable optical waveguide core width or diameter of optical waveguide 333. The constant grating period P4 is formed with first recesses 324. For pedagogical purposes, the optical waveguide core width or diameter is illustrated as varying with a square function having a period P5 resulting in periodic second recesses 334 in the optical waveguide core width or diameter; however, the core with a width varying along length L of the Bragg grating may be implemented in other ways. Optionally, P5 is greater than P4. The cladding 221 surrounds a core 222. Optionally, the chirped Bragg grating is formed in optical fiber or planar optical waveguide. The core 322 has a higher index of refraction than the cladding 321.

Figure 3B:
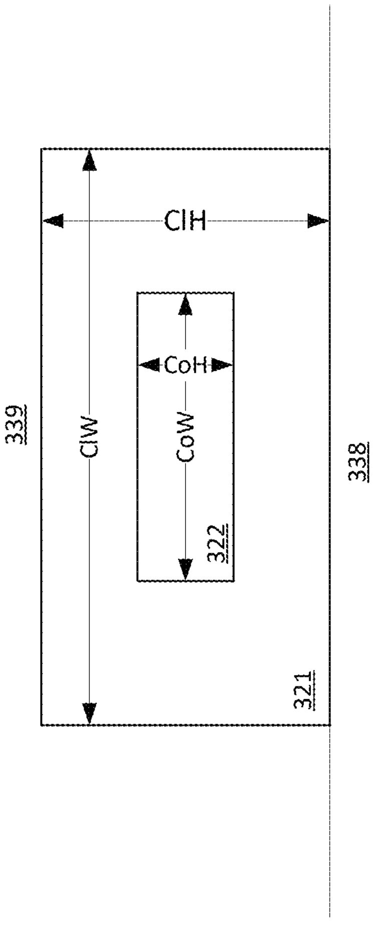
FIG. 3B illustrates a cross sectional view of a planar optical waveguide.

FIG. 3B illustrates a cross sectional view of a planar optical waveguide 339. The dispersive optical circuits, e.g., the Bragg gratings, described above may be implemented with the planar optical waveguide 339. The planar optical waveguide 339 includes a core 322 surrounded by cladding 321. The planar optical waveguide 339 is over a substrate 338. The core 322 has a higher index of refraction than the cladding 321. The core 322 has a core width CoW and a core height CoH. The cladding has a cladding width ClW and a cladding height ClH.

Returning to FIG. 1A, each dispersive optical circuit 102-1, 102-2 is configured to, using a received optical frequency comb, to generate another optical frequency comb by changing the relative phase between different spectral components of the received optical frequency comb (OFC) received by the dispersive optical circuit 102-1,102-2. The other optical frequency comb has at least some spectral components, e.g., all spectral components, that do not have the same phase as any other spectral component of the other optical frequency comb. As a result, the ARW noise of the ROG-OFC 100 is reduced by averaging all the comb components at the same time. ROG The first dispersive optical circuit 102-1 is configured to generate, using the first optical frequency comb 103-1, a third optical frequency comb 104-1 having at least some spectral components, e.g., all spectral components, that do not have the same phase noise as any other spectral component of the third optical frequency comb 104-1. The second dispersive optical circuit 102-2 is configured to generate, using the second optical frequency comb 103-2, a fourth optical frequency comb 104-2 having at least some spectral components, e.g., all spectral components, that do not have the same phase noise as any other spectral component of the fourth optical frequency comb 104-2.

A coupled optical resonator 105 is configured to receive at least a portion 105-1 of the third optical frequency comb 104-1. The at least a portion 105-1 of the third optical frequency comb 104-1 is configured to propagate around the coupled optical resonator 105 in a first direction.

The coupled optical resonator 105 is further configured to receive at least a portion 105-2 of the fourth optical frequency comb 104-2. The at least a portion 105-2 of the second optical frequency comb 104-2 is configured to propagate around the coupled optical resonator 105 in a second direction. Optionally, the first and the second directions may be clockwise (CW) and counterclockwise (CCW), or counterclockwise and clockwise.

The coupled optical resonator includes optical coupling circuitry, e.g., optical waveguide(s) and/or optical mirror(s), and an optical resonator. Optionally, each of the optical coupling circuitry and the optical resonator may be made from optical fiber or planar optical waveguide. Optionally, the optical resonator is a travelling wave resonator. Optionally, the optical resonator may be an optical fiber coil or a planar optical resonator, e.g., a disc, oval, ring, racetrack, a microsphere, or any other type of planar optical resonator.

The coupled optical resonator 105 is further configured to emit at least a portion 106-1 of the at least a portion 105-1 of the third optical frequency comb 104-1. The coupled optical resonator 105 is further configured to emit at least a portion 106-2 of the at least a portion 105-2 of the second optical frequency comb 104-2.

A first optical detector (OD1) 107-1 and a second optical detector (OD2) 107-2 are optically coupled to the coupled optical resonator 105. Each optical detector 107-1, 107-2 is configured to convert optical energy to an electrical signal. Optionally, a parameter (e.g., a current level or a voltage level) of the electrical signal is proportional to energy of an optical signal incident upon the optical detector 107-1, 107-2. Optionally, each optical detector 107-1, 107-2 is implemented with a photodiode or another type of optical detector; optionally, each optical detector 107-1, 107-2 includes a transimpedance amplifier. The first optical detector 107-1 is configured to receive the at least a portion 106-1 of the at least a portion 105-1 of the third optical frequency comb 104-1. The second optical detector 107-2 is configured to receive the at least a portion 106-2 of the at least a portion 105-2 of each of the fourth optical frequency comb 104-2.

The first optical detector 107-1 is configured to generate a first electrical signal 108-1 derived from the portion 106-1 of the at least a portion 105-1 of the third optical frequency comb 104-1. The second optical detector 107-2 is configured to generate a second electrical signal 108-2 derived from the portion 106-2 of the at least a portion 105-2 of each of the fourth optical frequency comb 104-2.

The first optical detector 107-1 is configured to be electrically coupled to the first optical frequency comb source 101-1. The first optical frequency comb source 101-1 is configured to receive the first electrical signal 108-1 or another signal derived from the first electrical signal 108-1, e.g., using the Pound-Drever-Hall technique. Using the first electrical signal 108-1 or the other signal, the first optical frequency comb source 101-1 is configured to adjust a frequency of each spectral component of the first optical frequency comb 104-1 so that each spectral component is aligned with a resonance of the coupled optical resonator 105 in the first direction around the coupled optical resonator 105.

The second optical detector 107-2 is configured to be electrically coupled to the second optical frequency comb source 101-2. The second optical frequency comb source 101-2 is configured to receive the second electrical signal 108-2 or another signal derived from the second electrical signal 108-2, e.g., using the Pound-Drever-Hall technique. Using the second electrical signal 108-2 or the other signal, the second optical frequency comb source 101-2 is configured to adjust a frequency of each spectral component of the second optical frequency comb 104-2 so that each spectral component is aligned with a resonance of the coupled optical resonator 105 in a second direction around the coupled optical resonator 105.

The first direction around the coupled optical resonator 105 is opposite the second direction around the coupled optical resonator 105. One of the first and the second directions is a clockwise (CW) direction. The other of the first and the second directions is a counterclockwise (CCW) direction.

The resonant frequency in the CW direction and the resonant frequency in the CCW direction of the coupled optical resonator 105 change as the ROG-OFC 100 is rotated, e.g., around a rotation axis 105-3 of the coupled optical resonator. The ROG-OFC 100, e.g., the coupled optical resonator 105, has an angular rate of rotation Q, e.g., around the rotation axis 105-3.

The processing system 109 is configured to receive data indicative of a frequency of each spectral component of the first OFC 103-1 and the second OFC-2. Optionally, the processing system 109 obtains such data from, and is electrically coupled to, each of the first optical frequency comb source 101-1 and the second optical frequency comb source 101-2; however, alternatively and optionally, the processing system 109 may obtain such data from the first electrical signal 108-1 and the second electrical signal 108-2. Using frequencies of pairs of spectral components of the first OFC 103-1 and the second OFC 103-2, the processing system 109 is configured to determine an angular rate of rotation 2 of the coupled optical resonator 105, e.g., around the rotation axis 105-3.

Figure 4:
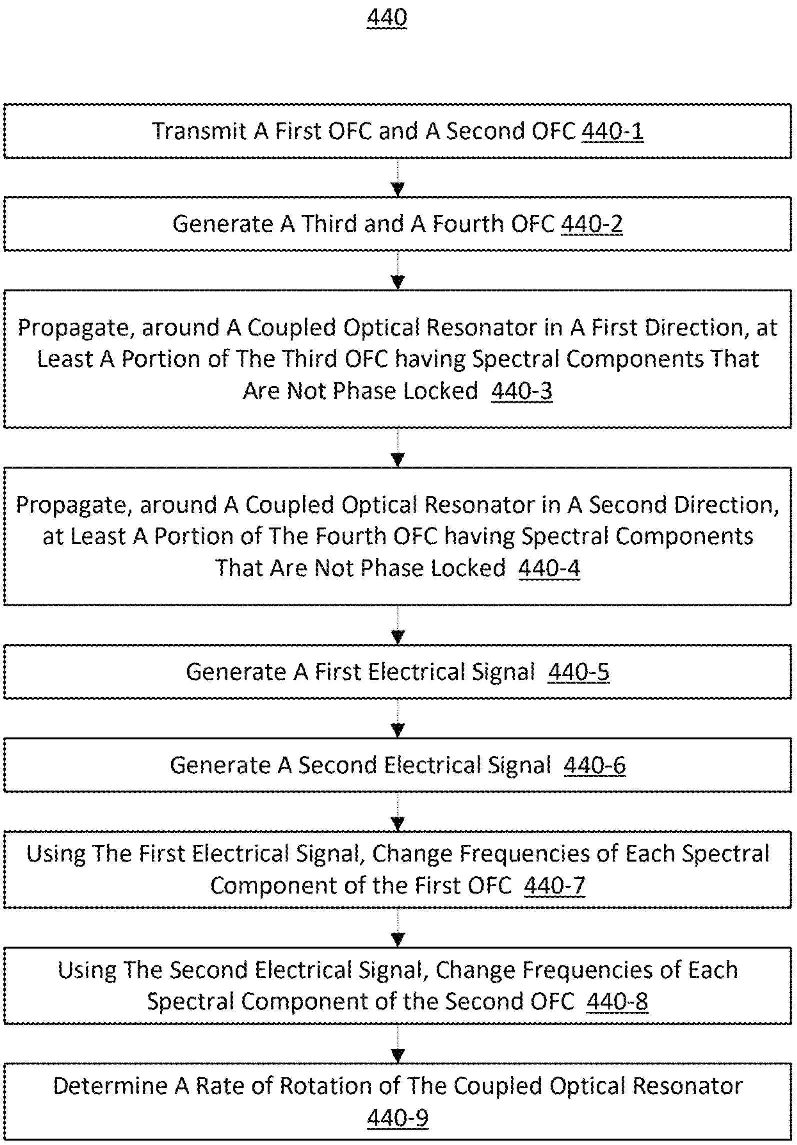
FIG. 4 illustrates a flow diagram of one embodiment of a method of reducing angle random walk noise in an ROG.

FIG. 4 illustrates a flow diagram of one embodiment of a method 440 of reducing angle random walk noise in an ROG in addition to increasing ROG bias stability. Exemplary method 440 may be implemented by one or more of the apparatuses illustrated in FIGS. 1A-3B. To the extent the methods herein are described herein as being implemented with the apparatus illustrated in FIGS. 1A-3B, it is to be understood that other embodiments can be implemented in other ways. Techniques described with respect to the embodiments illustrated by FIGS. 1A-3B may be applicable to the method 440.

The blocks of the flow diagrams herein have been arranged in a generally sequential manner for ease of explanation; however, it is to be understood that this arrangement is merely exemplary, and it should be recognized that the processing associated with the methods (and the blocks shown in the Figures) can occur in a different order (for example, where at least some of the processing associated with the blocks is performed in parallel and/or in an event-driven manner).

In block 440-1, a first optical frequency comb and a second optical frequency comb are each transmitted, e.g., respectively from a first optical frequency comb source and a second optical frequency comb source. Each of the first and the second optical frequency combs has spectral components equally spaced in frequency.

In block 440-2, a third optical frequency comb and a fourth optical frequency comb are generated. Optionally, the third optical frequency comb is generated by a first dispersive optical circuit, by changing a phase of at least some, e.g., all, spectral components of the first optical frequency comb. The third optical frequency comb has at least some spectral components that do not have the same phase as any other spectral component of the third optical frequency comb. Optionally, the fourth optical frequency comb is generated by a second dispersive optical circuit, by changing a phase of at least some, e.g., all, spectral component of the first optical frequency comb. The fourth optical frequency comb has at least some spectral components that do not have the same phase as any other spectral component of the third optical frequency comb.

In block 440-3, at least a portion of the first optical frequency comb having spectral components that are not phase locked is propagated around a coupled optical resonator in a first direction. In block 440-4, at least a portion of the second optical frequency comb having spectral components that are not phase locked is propagated around a coupled optical resonator in a second direction. Optionally, the first and the second directions may be clockwise and counterclockwise, or counterclockwise and clockwise.

In block 440-5, a first electrical signal is generated or derived, e.g., with a first optical detector, from at least a portion (of the at least a portion of each of the third optical frequency comb having spectral components that are not phase locked) received from the coupled optical resonator. In block 440-6, a second electrical signal is generated or derived, e.g., with a second optical detector, from at least a portion (of the at least a portion of each of the third optical frequency comb having spectral components that are not phase locked) received from the coupled optical resonator.

In block 440-7, using the first electrical signal, frequencies of each spectral component of the first optical frequency comb are changed due to a rotation of the coupled optical resonator around a rotation axis of the coupled optical resonator. In block 440-8, using the second electrical signal, frequencies of each spectral component of the second optical frequency comb are changed due to the rotation of the coupled optical resonator around a rotation axis of the coupled optical resonator. In block 440-9, using data indicative of a frequency of each spectral component of the first and the second optical frequency combs, an angular rate of rotation of the coupled optical resonator is determined.

While the present teachings have been illustrated with respect to one or more implementations, alterations and/or modifications can be made to the illustrated examples without departing from the scope of the appended claims. In addition, while a particular feature of the present disclosure may have been described with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and/or the claims, such terms are intended to be inclusive in a manner similar to the term "comprising." The term "at least one of" is used to mean one or more of the listed items can be selected. As used herein, the term "one or more of" with respect to a listing of items such as, for example, A and B or A and/or B, means A alone, B alone, or A and B. The term "at least one of" is used to mean one or more of the listed items can be selected.

A processing system may include processor circuitry coupled to memory circuitry. The processor circuitry described herein may include one or more microprocessors, microcontrollers, digital signal processing (DSP) elements, application-specific integrated circuits (ASICs), and/or field programmable gate arrays (FPGAs). In this exemplary embodiment, processor circuitry includes or functions with software programs, firmware, or other computer readable instructions for carrying out various process tasks, calculations, and control functions, used in the methods described herein. These instructions are typically tangibly embodied on any storage media (or computer readable medium) used for storage of computer readable instructions or data structures.

The memory circuitry described herein can be implemented with any available storage media (or computer readable medium) that can be accessed by a general purpose or special purpose computer or processor, or any programmable logic device. Suitable computer readable medium may include storage or memory media such as semiconductor, magnetic, and/or optical media. For example, computer readable media may include conventional hard disks, Compact Disk-Read Only Memory (CD-ROM), DVDs, volatile or non-volatile media such as Random Access Memory (RAM) (including, but not limited to, Dynamic Random Access Memory (DRAM)), Read Only Memory (ROM), Electrically Erasable Programmable ROM (EEPROM), and/or flash memory. Combinations of the above are also included within the scope of computer readable media.

Methods (or portions thereof) of the invention can be implemented in computer readable instructions, such as program modules or applications, which may be stored in the computer readable medium that is part of (optionally the memory circuitry) or communicatively coupled to the processing circuitry, and executed by the processing circuitry, optionally the processor circuitry. Generally, program modules or applications include routines, programs, objects, data components, data structures, algorithms, and the like, which perform particular tasks or implement particular abstract data types.

EXAMPLE EMBODIMENTS

A resonant optical gyroscope (ROG) with reduced angle random walk noise, the ROG comprising: a first optical frequency comb source including a first laser and configured to emit a first optical frequency comb with spectral components equally spaced in frequency; a second optical frequency comb source including a second laser and configured to emit a second optical frequency comb with spectral components equally spaced in frequency; a first dispersive optical circuit optically coupled to the first optical frequency comb source and configured, using the first optical frequency comb, to generate a third optical frequency comb by changing a phase of at least some spectral components of the first optical frequency comb, wherein the third optical frequency comb has at least some spectral components that do not have a same phase as any other spectral component of the third optical frequency comb; a second dispersive optical circuit optically coupled to the second optical frequency comb source and configured, using the second optical frequency comb, to generate a fourth optical frequency comb by changing a phase of at least some spectral components of the second optical frequency comb, wherein the fourth optical frequency comb has at least some spectral components that do not have a same phase as any other spectral component of the fourth optical frequency comb; a coupled optical resonator optically coupled to each of the first and the second dispersive optical circuits, and configured to propagate at least a portion of the third optical frequency comb around a first direction in the coupled optical resonator and to propagate at least a portion of the fourth optical frequency comb around a second direction in the coupled optical resonator, wherein the first direction is opposite the second direction; a first optical detector optically coupled to the coupled optical resonator and configured to generate a first electrical signal derived from at least a portion of the at least a portion of the third optical frequency comb received from the coupled optical resonator; a second optical detector optically coupled to the coupled optical resonator and configured to generate a second electrical signal derived from at least a portion of the at least a portion of the fourth optical frequency comb received from the coupled optical resonator; wherein the first optical frequency comb source is configured to use the first electrical signal, or a signal derived therefrom, to align frequencies of the spectral components of the first optical frequency comb with resonances in the first direction of the coupled optical resonator; wherein the second optical frequency comb source is configured to use the second electrical signal, or a signal derived therefrom, to align frequencies of the spectral components of the second optical frequency comb with resonances in the second direction of the coupled optical resonator; and processing circuitry configured to, using data indicative of frequencies of pairs of spectral components of the first and the second optical frequency combs, determine an angular rate of rotation of the coupled optical resonator.

Example 2 includes the ROG of Example 1, wherein each of the first and the second optical frequency comb sources comprises a mode locked laser, a laser optically coupled to a non-linear optical circuit, a mode locked laser optically coupled to a photonic crystal fiber, or a laser optically coupled to either at least one optical phase modulator or an optical resonator.

Example 3 includes the ROG of Example of any of Examples 1-2, wherein the coupled optical resonator includes a travelling wave resonator.

Example 4 includes the ROG of any of Examples 1-3, wherein each of the first and the second optical frequency combs span a bandwidth from one gigahertz to one hundred terahertz.

Example 5 includes the ROG of any of Examples 1-4, wherein each of the first and the second dispersive optical circuits has a non-zero group delay greater than 100 femtoseconds$^2$.

Example 6 includes the ROG of any of Examples 1-5, wherein each of the first and the second dispersive optical circuits includes a chirped Bragg grating whose grating period varies over a length of the chirped Bragg grating or a Bragg grating with a fixed grating period and an optical waveguide core width or diameter which varies over the length of the Bragg grating.

Example 7 includes the ROG of any of Examples 1-6, wherein the coupled optical resonator comprises an optical fiber coil or a planar optical resonator.

Example 8 includes the ROG of any of Examples 1-7, wherein the processing circuitry is electrically coupled to each of the first optical frequency comb source and the second optical frequency comb source which are further configured to provide the data indicative of the frequency of each spectral component of the first and the second optical frequency combs.

Example 9 includes the ROG of any of Examples 1-8, wherein each of the first and the second optical detectors is a photodiode.

Example 10 includes a method for reducing angle random walk noise of a resonant optical gyroscope (ROG), the method comprising: transmitting a first optical frequency comb; transmitting a second optical frequency comb, wherein each of the first and the second optical frequency combs has spectral components equally spaced in frequency; generating a third optical frequency comb by changing a phase of at least some spectral components of the first optical frequency comb, wherein the third optical frequency comb has at least some spectral components that do not have a same phase as any other spectral component of the third optical frequency comb; generating a fourth optical frequency comb by changing a phase of at least some spectral components of the second optical frequency comb, wherein the fourth optical frequency comb has at least some spectral components that do not have a same phase as any other spectral component of the fourth optical frequency comb; propagating, around a coupled optical resonator in a first direction, at least a portion of the of the third optical frequency comb; propagating, around the coupled optical resonator in a second direction, at least a portion of the fourth optical frequency comb, wherein the first direction is opposite the second direction; generating a first electrical signal derived from at least a portion of the at least a portion of the third optical frequency comb received from the coupled optical resonator; generating a second electrical signal derived from at least a portion of the at least a portion of the fourth optical frequency comb received from the coupled optical resonator; using the first electrical signal, or a signal derived therefrom, adjusting frequencies of each spectral component of the first optical frequency comb to align frequencies of the spectral components of the first optical frequency comb with resonances in the first direction of the coupled optical resonator; using the second electrical signal, or a signal derived therefrom, adjusting frequencies of each spectral component of the second optical frequency comb to align frequencies of the spectral components of the second optical frequency comb with resonances in the second direction of the coupled optical resonator; and using data indicative of frequencies of pairs of spectral components of the first and the second optical frequency combs, determining an angular rate of rotation of the coupled optical resonator.

Example 11 includes the method of Example 10, wherein each of the first and the second optical frequency combs span a bandwidth from one gigahertz to one hundred terahertz.

Example 12 includes the method of any of Examples 10-11, wherein the coupled optical resonator comprises an optical fiber coil or a planar optical resonator.

Example 13 includes a resonant optical gyroscope (ROG) with reduced angle random walk noise, the ROG comprising: a first optical frequency comb source including a first laser and configured to emit a first optical frequency comb with spectral components equally spaced in frequency; a second optical frequency comb source including a second laser and configured to emit a second optical frequency comb with spectral components equally spaced in frequency; a first dispersive optical circuit optically coupled to the first optical frequency comb source and configured, using the first optical frequency comb, to generate a third optical frequency comb by changing a phase of at least some spectral components of the first optical frequency comb, wherein the third optical frequency comb has at least some spectral components that do not have a same phase as any other spectral component of the third optical frequency comb; a second dispersive optical circuit optically coupled to the second optical frequency comb source and configured, using the second optical frequency comb, to generate a fourth optical frequency comb by changing a phase of at least some spectral components of the second optical frequency comb, wherein the fourth optical frequency comb has at least some spectral components that do not have a same phase as any other spectral component of the fourth optical frequency comb; a coupled optical resonator, including an optical resonator with a rotation axis, optically coupled to each of the first and the second dispersive optical circuits, and configured to propagate at least a portion of the third optical frequency comb around a first direction in the coupled optical resonator and to propagate at least a portion of the fourth optical frequency comb around a second direction in the coupled optical resonator, wherein the first direction is opposite the second direction; a first optical detector optically coupled to the coupled optical resonator and configured to generate a first electrical signal derived from at least a portion of the at least a portion of the third optical frequency comb received from the coupled optical resonator; a second optical detector optically coupled to the coupled optical resonator and configured to generate a second electrical signal derived from at least a portion of the at least a portion of the fourth optical frequency comb received from the coupled optical resonator; wherein the first optical frequency comb source is configured to use the first electrical signal, or a signal derived therefrom, to align frequencies of the spectral components of the first optical frequency comb with resonances in the first direction of the coupled optical resonator; wherein the second optical frequency comb source is configured to use the second electrical signal, or a signal derived therefrom, to align frequencies of the spectral components of the second optical frequency comb with resonances in the second direction of the coupled optical resonator; and processing circuitry configured to, using data indicative of frequencies of pairs of spectral components of the first and the second optical frequency combs, determine an angular rate of rotation around the rotation axis of the coupled optical resonator.

Example 14 includes the ROG of Example 13, wherein each of the first and the second optical frequency comb sources comprises a mode locked laser, a laser optically coupled to a non-linear optical circuit, a mode locked laser optically coupled to a photonic crystal fiber, or a laser optically coupled to either at least one optical phase modulator or an optical resonator.

Example 15 includes the ROG of any of Examples 13-14, the coupled optical resonator includes a travelling wave resonator.

Example 16 includes the ROG of any of Examples 13-15, wherein each of the first and the second dispersive optical circuits has a non-zero group delay greater than 100 femtoseconds$^2$.

Example 17 includes the ROG of any of Examples 13-16, wherein each of the first and the second dispersive optical circuits includes a chirped Bragg grating whose grating period varies over a length of the chirped Bragg grating or a Bragg grating with a fixed grating period and an optical waveguide core width or diameter which varies over the length of the Bragg grating.

Example 18 includes the ROG of any of Examples 13-17, wherein the coupled optical resonator comprises an optical fiber coil or a planar optical resonator.

Example 19 includes the ROG of any of Examples 13-18, wherein the processing circuitry is electrically coupled to each of the first optical frequency comb source and the second optical frequency comb source which are further configured to provide the data indicative of the frequency of each spectral component of the first and the second optical frequency combs.

Example 20 includes the ROG of any of Examples 13-19, wherein each of the first and the second optical detectors is a photodiode.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A resonant optical gyroscope (ROG) with reduced angle random walk noise, the ROG comprising:

a first optical frequency comb source including a first laser and configured to emit a first optical frequency comb with spectral components equally spaced in frequency;

a second optical frequency comb source including a second laser and configured to emit a second optical frequency comb with spectral components equally spaced in frequency;

a first dispersive optical circuit optically coupled to the first optical frequency comb source and configured, using the first optical frequency comb, to generate a third optical frequency comb by changing a phase of at least some spectral components of the first optical frequency comb, wherein the third optical frequency comb has at least some spectral components that do not have a same phase as any other spectral component of the third optical frequency comb;

a second dispersive optical circuit optically coupled to the second optical frequency comb source and configured, using the second optical frequency comb, to generate a fourth optical frequency comb by changing a phase of at least some spectral components of the second optical frequency comb, wherein the fourth optical frequency comb has at least some spectral components that do not have a same phase as any other spectral component of the fourth optical frequency comb;

a coupled optical resonator optically coupled to each of the first and the second dispersive optical circuits, and configured to propagate at least a portion of the third optical frequency comb around a first direction in the coupled optical resonator and to propagate at least a portion of the fourth optical frequency comb around a second direction in the coupled optical resonator, wherein the first direction is opposite the second direction;

a first optical detector optically coupled to the coupled optical resonator and configured to generate a first electrical signal derived from at least a portion of the at least a portion of the third optical frequency comb received from the coupled optical resonator;

a second optical detector optically coupled to the coupled optical resonator and configured to generate a second electrical signal derived from at least a portion of the at least a portion of the fourth optical frequency comb received from the coupled optical resonator;

wherein the first optical frequency comb source is configured to use the first electrical signal, or a signal derived therefrom, to align frequencies of the spectral components of the first optical frequency comb with resonances in the first direction of the coupled optical resonator;

wherein the second optical frequency comb source is configured to use the second electrical signal, or a signal derived therefrom, to align frequencies of the spectral components of the second optical frequency comb with resonances in the second direction of the coupled optical resonator; and processing circuitry configured to, using data indicative of frequencies of pairs of spectral components of the first and the second optical frequency combs, determine an angular rate of rotation of the coupled optical resonator.

2. The ROG of claim 1, wherein each of the first and the second optical frequency comb sources comprises a mode locked laser, a laser optically coupled to a non-linear optical circuit, a mode locked laser optically coupled to a photonic crystal fiber, or a laser optically coupled to either at least one optical phase modulator or an optical resonator.

3. The ROG of claim 1, wherein the coupled optical resonator includes a travelling wave resonator.

4. The ROG of claim 1, wherein each of the first and the second optical frequency combs span a bandwidth from one gigahertz to one hundred terahertz.

5. The ROG of claim 1, wherein each of the first and the second dispersive optical circuits has a non-zero group delay greater than 100 $\text{femtoseconds}^2$.

6. The ROG of claim 1, wherein each of the first and the second dispersive optical circuits includes a chirped Bragg grating whose grating period varies over a length of the chirped Bragg grating or a Bragg grating with a fixed grating period and an optical waveguide core width or diameter which varies over the length of the Bragg grating.

7. The ROG of claim 1, wherein the coupled optical resonator comprises an optical fiber coil or a planar optical resonator.

8. The ROG of claim 1, wherein the processing circuitry is electrically coupled to each of the first optical frequency comb source and the second optical frequency comb source which are further configured to provide the data indicative of the frequency of each spectral component of the first and the second optical frequency combs.

9. The ROG of claim 1, wherein each of the first and the second optical detectors is a photodiode.

10. A method for reducing angle random walk noise of a resonant optical gyroscope (ROG), the method comprising:

transmitting a first optical frequency comb;

transmitting a second optical frequency comb, wherein each of the first and the second optical frequency combs has spectral components equally spaced in frequency;

generating a third optical frequency comb by changing a phase of at least some spectral components of the first optical frequency comb, wherein the third optical frequency comb has at least some spectral components that do not have a same phase as any other spectral component of the third optical frequency comb;

generating a fourth optical frequency comb by changing a phase of at least some spectral components of the second optical frequency comb, wherein the fourth optical frequency comb has at least some spectral components that do not have a same phase as any other spectral component of the fourth optical frequency comb;

propagating, around a coupled optical resonator in a first direction, at least a portion of the of the third optical frequency comb;

propagating, around the coupled optical resonator in a second direction, at least a portion of the fourth optical frequency comb, wherein the first direction is opposite the second direction;

generating a first electrical signal derived from at least a portion of the at least a portion of the third optical frequency comb received from the coupled optical resonator;

generating a second electrical signal derived from at least a portion of the at least a portion of the fourth optical frequency comb received from the coupled optical resonator;

using the first electrical signal, or a signal derived therefrom, adjusting frequencies of each spectral component of the first optical frequency comb to align frequencies of the spectral components of the first optical frequency comb with resonances in the first direction of the coupled optical resonator;

using the second electrical signal, or a signal derived therefrom, adjusting frequencies of each spectral component of the second optical frequency comb to align frequencies of the spectral components of the second optical frequency comb with resonances in the second direction of the coupled optical resonator; and using data indicative of frequencies of pairs of spectral components of the first and the second optical frequency combs, determining an angular rate of rotation of the coupled optical resonator.

11. The method of claim 10, wherein each of the first and the second optical frequency combs span a bandwidth from one gigahertz to one hundred terahertz.

12. The method of claim 10, wherein the coupled optical resonator comprises an optical fiber coil or a planar optical resonator.

13. A resonant optical gyroscope (ROG) with reduced angle random walk noise, the ROG comprising:

a first optical frequency comb source including a first laser and configured to emit a first optical frequency comb with spectral components equally spaced in frequency;

a second optical frequency comb source including a second laser and configured to emit a second optical frequency comb with spectral components equally spaced in frequency;

a first dispersive optical circuit optically coupled to the first optical frequency comb source and configured, using the first optical frequency comb, to generate a third optical frequency comb by changing a phase of at least some spectral components of the first optical frequency comb, wherein the third optical frequency comb has at least some spectral components that do not have a same phase as any other spectral component of the third optical frequency comb;

a second dispersive optical circuit optically coupled to the second optical frequency comb source and configured, using the second optical frequency comb, to generate a fourth optical frequency comb by changing a phase of at least some spectral components of the second optical frequency comb, wherein the fourth optical frequency comb has at least some spectral components that do not have a same phase as any other spectral component of the fourth optical frequency comb;

a coupled optical resonator, including an optical resonator with a rotation axis, optically coupled to each of the first and the second dispersive optical circuits, and configured to propagate at least a portion of the third optical frequency comb around a first direction in the coupled optical resonator and to propagate at least a portion of the fourth optical frequency comb around a second direction in the coupled optical resonator, wherein the first direction is opposite the second direction;

a first optical detector optically coupled to the coupled optical resonator and configured to generate a first electrical signal derived from at least a portion of the at least a portion of the third optical frequency comb received from the coupled optical resonator;

a second optical detector optically coupled to the coupled optical resonator and configured to generate a second electrical signal derived from at least a portion of the at least a portion of the fourth optical frequency comb received from the coupled optical resonator;

wherein the first optical frequency comb source is configured to use the first electrical signal, or a signal derived therefrom, to align frequencies of the spectral components of the first optical frequency comb with resonances in the first direction of the coupled optical resonator;

wherein the second optical frequency comb source is configured to use the second electrical signal, or a signal derived therefrom, to align frequencies of the spectral components of the second optical frequency comb with resonances in the second direction of the coupled optical resonator; and processing circuitry configured to, using data indicative of frequencies of pairs of spectral components of the first and the second optical frequency combs, determine an angular rate of rotation around the rotation axis of the coupled optical resonator.

14. The ROG of claim 13, wherein each of the first and the second optical frequency comb sources comprises a mode locked laser, a laser optically coupled to a non-linear optical circuit, a mode locked laser optically coupled to a photonic crystal fiber, or a laser optically coupled to either at least one optical phase modulator or an optical resonator.

15. The ROG of claim 13, the coupled optical resonator includes a travelling wave resonator.

16. The ROG of claim 13, wherein each of the first and the second dispersive optical circuits has a non-zero group delay greater than 100 femtoseconds$^2$.

17. The ROG of claim 13, wherein each of the first and the second dispersive optical circuits includes a chirped Bragg grating whose grating period varies over a length of the chirped Bragg grating or a Bragg grating with a fixed grating period and an optical waveguide core width or diameter which varies over the length of the Bragg grating.

18. The ROG of claim 13, wherein the coupled optical resonator comprises an optical fiber coil or a planar optical resonator.

19. The ROG of claim 13, wherein the processing circuitry is electrically coupled to each of the first optical frequency comb source and the second optical frequency comb source which are further configured to provide the data indicative of the frequency of each spectral component of the first and the second optical frequency combs.

20. The ROG of claim 13, wherein each of the first and the second optical detectors is a photodiode.

* * * * *